United States Patent Office 2,801,150
Patented July 30, 1957

2,801,150
METHOD OF MOLDING RUBBER AND MOLD FOR SAME

Leonard D. Koryta, Parma, Ohio, assignor to Richard C. Weiss, Cleveland, Ohio, as trustee No Drawing. Application May 10, 1954,
Serial No. 428,836

5 Claims. (Cl. 18—47)

The present invention relates to a new method of molding rubber or other plastic substances and to the mold employed in carrying out the method, more particularly, to a new and improved surface treatment for molds whereby the molded products can be separated from the molds more easily than heretofore and whereby the labor for maintenance of the molds is considerably decreased.

It is an object of the present invention to provide a new and improved mold which when used in the usual way will permit the molded product to be easily separated from the mold.

It is still another object of the present invention to provide a new and improved mold for rubber and the like articles which in the molding operation prevents adherence of constituents of the molding material to the mold surfaces, which has been unavoidable heretofore, and hence one which requires very little maintenance with its resulting delays and expense.

It is a more specific object to provide a new and improved surface coating for molds which when treated with a lubricant will permit the molded products to be separated from the mold more easily and more completely than heretofore.

It is a further object to provide a new and improved process of molding rubber and like articles which process allows the molded articles to be more easily removed from the mold than was heretofore possible, and which process can be used to make a far greater number of molded articles between cleaning periods of the mold than was heretofore possible.

Still other objects and advantages will be apparent to those skilled in the art to which this invention relates from the following description forming a part of this disclosure.

As indicated above, the present invention relates to a coating for molds and the like, and particularly, rubber molds. Prior to the present invention, rubber molds which were used over a period of days, and at the most, approximately a week, have had scolds, carbon, organic material, etc. deposited on their surfaces to such an extent that the molds could no longer be used.

The normal commercial rubber molding process comprises coating the surfaces of the rubber mold with a lubricant, which is usually a soap solution, but which may also be silicone material where the degree of heat and pressure is great enough, placing rubber material into the mold, and polymerizing the material by means of applying heat. In most instances the molds comprise two or more pieces which are easily separated and which are continually heated such that when solid rubber materials are added to the mold, they become plastic enough to flow and conform to the shape of the mold after which they become polymerized.

Numerous types of surfaces have been used for such molds, some of which are formed by the usual machine tooling operations; others of which have been ground surfaces, and still others, plated surfaces. In still other instances crystalline phosphates, and particularly crystalline zinc phosphates, have been tried with the view in mind of increasing the ease with which the molded rubber objects could be stripped from the molds. None of the surface treatments utilized heretofore have increased to any appreciable extent the life of rubber molds. Furthermore, all of the surfaces used heretofore have had scolds, carbon, and other materials, deposited on their surfaces to such an extent that the molds have had to be taken out of service after a few days operation and scraped or otherwise cleaned. This procedure is both time-consuming and costly.

According to the principles of the present invention the surfaces of a mold are coated with a substantially non-crystalline or amorphous substance which forms a hard smooth coating upon the surfaces of the mold. It has been found that if such surfaces are coated with a lubricant and are used to mold rubber and the like, the molded articles can be stripped from the non-crystalline surface more easily than has been possible with any other known type of surface. It has further been found that carbon and other deposits do not tend to cling to the lubricated non-crystalline surfaces, whereas these deposits have built up markedly upon metallic, crystalline phosphate and other surfaces used heretofore. Numerous inorganic materials are known to have amorphous structures and are known to be capable of being applied to metallic surfaces. The details involved in applying one of such compounds to the surfaces of a metallic mold will be later described.

As an illustration of the preparation and use of one such mold, a steel mold which had formerly been used to make rubber grommets for automotive use was scraped clean of deposits and had a substantially amorphous zinc phosphate coating applied to its surfaces by the following procedure:

1. All grease, oil, etc., were removed from the surfaces of the mold by a conventional vapor degreasing machine;

2. The mold was immersed for approximately 20 seconds in a phosphoric acid bath made by dissolving 1600 pounds of 75% orthophosphoric acid in 1000 gallons of water;

3. The mold was given a rinse in cold running water for approximately three minutes;

4. It was then immersed in a zinc phosphate bath of the type which contains modifiers which modify and inhibit crystalline growth. The specific bath used was approximately a 4% by volume solution of "Meta Bond No. 14" in water. The temperature of the bath was held at approximately 200 degrees F. and the mold was immersed for approximately 7 minutes. "Meta Bond No. 14" has a specific gravity of 1.583 and is a trade name for a commercial product of the International Rustproof Corporation and whose composition may vary but is approximately as follows:

| Radical: | Percent by weight |
|---|---|
| Zn | 9.92 |
| Fe | less than 1 |
| Al | less than 1 |
| $NH_4$ | 1.33 |
| Ca | 5.35 |
| Cl | 5.19 |
| $NO_3$ | 16.20 |
| Total $PO_4$ | 18.91 |
| Water | Balance |
| Free $H_3PO_4$ | 9.90 |

5. The mold was given a rinse in cold running water for 3 minutes;

6. The mold was then immersed in a chromic acid bath made by dissolving 5 pounds of chromic acid flake in 1000 gallons of water;

7. The mold was then dried.

The coating obtained by the above process appeared smooth and uniform and showed no crystalline structure when observed under a 100-diameter magnification.

The coated mold was thereafter put back into production making the same identical product as the original plain steel mold. The coated mold was used under the same operating conditions that it had been subjected to originally and the same type of soap solution was used as a lubricant. The service life of the original plain steel mold had been approximately five days of continuous use, after which time deposits built up on the surface of the mold to the extent that imperfections or "scold" marks were formed in the surface of the molded product. The mold after having the amorphous coating applied, was used continuously for twelve weeks without having harmful deposits accumulate on its molding surfaces, and without producing imperfections or "scolds" in the surface of the molded articles. In addition to the above advantage, the articles produced in the coated mold could be removed more easily than could the articles produced by the plain steel mold. As pointed out above other types of molding surfaces including metal plated surfaces and crystalline zinc phosphate surfaces have been used heretofore. All of the above types of molding surfaces exhibit approximately the same length of service life between cleanings and require approximately the same degree of force for the removal of their molded article.

The reason for the beneficial results achieved by the amorphous surface is believed to be that there are no sharp surface irregularities, as one characteristic of crystalline surfaces, which may extend through the film of lubricant applied to the surface and so provide unprotected areas to which deposits may cling.

Another reason why the amorphous structure produces the beneficial results that it does is believed to be that the amorphous structure does not have a porous texture that will retain air etc. when the lubricant is applied.

For the purposes of this disclosure, the words "substantially non-crystalline" and "substantially amorphous" shall be construed to mean molecular arrangements which either do not have crystalline structures, or which, if they do have crystalline structures, are of such minute crystalline size that for all intents and purposes the crystalline structure does not affect the above-described process.

The procedure used in the above example for degreasing the metal surface, depositing the amorphous coating and for its subsequent acid bath are not steps which must be rigidly followed. The degreasing step can be accomplished by any well known commercial degreasing process and may include an alkali bath. The phosphoric acid bath can be skipped if there is no rust or mill scale and the chromic acid bath is not essential.

Having thus described my invention, I claim:

1. A ferrous mold for vulcanizing rubber having a surface coating comprising substantially non-crystalline zinc phosphate.

2. A ferrous metal mold for vulcanizing rubber, said mold having a hard non-dusting amorphous coating comprising zinc phosphate and a lubricant applied to said coating.

3. The process of molding rubber and like material, which comprises applying to the surface of a ferrous mold, suitable for vulcanizing rubber, a hard amorphous non-dusting coating of zinc phosphate, placing the rubber to be vulcanized in said mold, vulcanizing said material and removing the rubber article.

4. The process of molding rubber and like material, which comprises applying to the surface of a ferrous mold, suitable for vulcanizing rubber, a hard non-dusting amorphous coating of zinc phosphate, applying a lubricant to said coating, placing the rubber to be vulcanized in said mold, vulcanizing said material and removing the rubber article.

5. The process of molding rubber and like material, which comprises applying to the surface of a ferrous mold, suitable for vulcanizing rubber, a hard amorphous non-dusting coating of zinc phosphate, applying a soap solution to the surface of said mold, placing the rubber to be vulcanized in said mold, vulcanizing said material and removing the rubber article.

References Cited in the file of this patent

UNITED STATES PATENTS

| Number | Name | Date |
|---|---|---|
| 1,492,694 | Meloche | May 6, 1924 |
| 1,462,563 | Voltz | July 24, 1933 |
| 1,969,937 | Maynard | Aug. 14, 1934 |
| 2,092,813 | Oakleaf | Sept. 14, 1937 |
| 2,287,270 | Partridge | June 23, 1942 |
| 2,530,458 | Frisch | Nov. 21, 1950 |
| 2,618,530 | Gardner | Nov. 18, 1952 |
| 2,774,701 | Koryta | Dec. 18, 1956 |

OTHER REFERENCES

Abstract, 37,498, published Nov. 20, 1951, 652 O. G. 891.

Schuster et al.: abstract of application Ser. No. 37,498, 652 O. G. 891, published Nov. 20, 1951.